US011359624B2

United States Patent
Kurihara et al.

(10) Patent No.: US 11,359,624 B2
(45) Date of Patent: Jun. 14, 2022

(54) CAPACITY CONTROL VALVE HAVING A SOLENOID AND A SECOND PLUNGER BETWEEN THE SOLENOID AND A VALVE BODY

(71) Applicant: EAGLE INDUSTRY CO., LTD., Tokyo (JP)

(72) Inventors: Daichi Kurihara, Tokyo (JP); Kohei Fukudome, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 174 days.

(21) Appl. No.: 16/622,200

(22) PCT Filed: Jul. 3, 2018

(86) PCT No.: PCT/JP2018/025121
§ 371 (c)(1),
(2) Date: Dec. 12, 2019

(87) PCT Pub. No.: WO2019/009264
PCT Pub. Date: Jan. 10, 2019

(65) Prior Publication Data
US 2021/0048018 A1 Feb. 18, 2021

(30) Foreign Application Priority Data

Jul. 5, 2017 (JP) .............................. JP2017-132151

(51) Int. Cl.
*F04B 49/12* (2006.01)
*F04B 27/18* (2006.01)
(Continued)

(52) U.S. Cl.
CPC .............. *F04B 49/12* (2013.01); *F04B 1/295* (2013.01); *F04B 27/1804* (2013.01);
(Continued)

(58) Field of Classification Search
CPC ............ F04B 49/125; F04B 2027/1809; F04B 2027/1818; F04B 2027/1803;
(Continued)

(56) References Cited

U.S. PATENT DOCUMENTS

| 6,234,763 | B1 | 5/2001 | Ota | F04B 27/1804 |
| 6,939,112 | B2 * | 9/2005 | Taguchi | F04B 27/1804 |
| | | | | 417/222.2 |

(Continued)

FOREIGN PATENT DOCUMENTS

| JP | 2003322086 | | 11/2003 | .............. F04B 49/00 |
| JP | 2004353451 | A | 12/2004 | |

(Continued)

OTHER PUBLICATIONS

International Search Report (ISR) dated Sep. 25, 2018, issued for International application No. PCT/JP2018/025121. (1 page).

(Continued)

*Primary Examiner* — Nathan C Zollinger
*Assistant Examiner* — Timothy P Solak
(74) *Attorney, Agent, or Firm* — Hayes Soloway P.C.

(57) ABSTRACT

A capacity control valve for controlling a flow rate or pressure of a variable capacity compressor includes: a valve main body, a valve body arranged in the valve main body, a solenoid having a first plunger connected to the valve body, and a second plunger arranged between the solenoid and the valve body for regulating flow of the variable capacity compressor.

10 Claims, 13 Drawing Sheets

(51) Int. Cl.
*F04B 49/02* (2006.01)
*F16K 31/06* (2006.01)
*F04B 1/295* (2020.01)

(52) U.S. Cl.
CPC ............ *F04B 49/02* (2013.01); *F04B 49/125* (2013.01); *F16K 31/06* (2013.01); *F04B 2027/1809* (2013.01); *F04B 2027/1813* (2013.01); *F04B 2027/1818* (2013.01)

(58) Field of Classification Search
CPC ...... F04B 2027/1822; F04B 2027/1836; F04B 2027/1813
See application file for complete search history.

(56) References Cited

U.S. PATENT DOCUMENTS

| | | | | |
|---|---|---|---|---|
| 8,931,517 | B2* | 1/2015 | Okamoto | F16K 31/0624 137/625.68 |
| 2006/0280616 | A1 | 12/2006 | Umemura | F04B 27/1804 |
| 2008/0247883 | A1* | 10/2008 | Yokomachi | F04B 27/1804 417/218 |
| 2009/0183786 | A1* | 7/2009 | Iwa | F04B 27/1804 137/487.5 |
| 2012/0198992 | A1 | 8/2012 | Futakuchi | F04B 27/1804 |
| 2015/0211502 | A1* | 7/2015 | Ota | F04B 1/295 417/270 |

FOREIGN PATENT DOCUMENTS

| | | |
|---|---|---|
| JP | 2005307817 A | 11/2005 |
| JP | 5167121 B2 | 3/2013 |
| WO | 2007119380 A1 | 10/2007 |

OTHER PUBLICATIONS

U.S. Appl. No. 16/622,200, filed Dec. 12, 2019, Kurihara et al.
U.S. Appl. No. 16/624,251, filed Dec. 18, 2019, Kurihara et al.
Search Report, Written Opinion and International Search Report issued in corresponding PCT International Patent Application Serial No. PCT/JP2018/025121, 23 pages.
Search Report, Written Opinion and International Search Report issued in corresponding PCT International Patent Application Serial No. PCT/JP2018/025123, 19 pages.

* cited by examiner

CAPACITY CONTROL VALVE HAVING A SOLENOID AND A SECOND PLUNGER BETWEEN THE SOLENOID AND A VALVE BODY

CROSS-REFERENCE TO RELATED APPLICATIONS

This application is the U.S. National Phase under 35 U.S.C. § 371 of International Application PCT/JP2018/025121, filed Jul. 3, 2018, which claims priority to Japanese Patent Application No. JP2017-132151, filed Jul. 5, 2017. The International Application was published under PCT Article 21(2) in a language other than English.

TECHNICAL FIELD

The present invention relates to a capacity control valve for controlling a flow rate or pressure of a variable capacity compressor, and, particularly, relates to a capacity control valve for controlling a discharge rate of a variable capacity compressor and the like used for an air-conditioning system for motor vehicle and the like according to a pressure load.

BACKGROUND ART

A swash plate type variable capacity compressor used for an air-conditioning system for motor vehicle and the like includes a rotating shaft rotationally driven by the rotational force of an engine, a swash plate which is coupled to the rotating shaft so that its inclination angle may be varied, a piston for compression coupled to the swash plate, and the like, and changes the inclination angle of the swash plate, thereby changing a stroke of the piston and controlling a discharge rate of a refrigerant.

By appropriately controlling pressure within a control chamber and adjusting a balancing state of the pressure acting on the both surfaces of the piston by means of a capacity control valve which is driven to be opened or closed by electromagnetic force while utilizing a suction pressure of a suction chamber for suctioning a refrigerant, a discharge pressure of a discharge chamber for discharging the refrigerant pressurized by the piston, and a control chamber pressure of the control chamber (a crank chamber) containing the swash plate, the inclination angle of the swash plate can be continuously changed.

As shown in FIG. 11, such a capacity control valve 160 includes: a valve section 170 having a second valve chamber 182 communicating with a discharge chamber via a second communication passage 173, a first valve chamber 183 communicating with a suction chamber via a first communication passage 171, and a third valve chamber 184 communicating with a control chamber via a third communication passage 174; a pressure-sensitive body 178 which is arranged in the third valve chamber to extend and contract by ambient pressure and which has a valve seat body 180 provided at a free end in an extension and contraction direction; a valve body 181 having a second valve part 176 for opening and closing a valve hole 177 for communicating the second valve chamber 182 and the third valve chamber 184, a first valve part 175 for opening and closing the first communication passage 171 and a circulation groove 172, and a third valve part 179 for opening and closing the third valve chamber 184 and the circulation groove 172 by engagement and disengagement to and from the valve seat body 180 in the third valve chamber 184; a solenoid section 190 for exerting an electromagnetic driving force on the valve body 181, and the like.

Then, in the control capacity valve 160, without providing a clutch mechanism in a variable capacity compressor, a pressure in the control chamber (a control chamber pressure) Pc and a suction pressure Ps (a suction pressure) can be adjusted by communicating the discharge chamber and the control chamber in a case where the need to change the control chamber pressure arises (Hereinafter, it is referred to as a "conventional art". For example, see Patent Document 1.).

CITATION LIST

Patent Documents

Patent Document 1: JP 5167121 B

SUMMARY OF THE INVENTION

Problem to be Solved by the Invention

In the conventional art, if the swash plate type variable capacity compressor is stopped and then is intended to be started after a long-time standing, a liquid refrigerant (the refrigerant which is liquefied by being cooled during standing) is accumulated in the control chamber (crank chamber), and therefore it is impossible to secure a set discharge rate by compressing the refrigerant unless the liquid refrigerant is discharged. Therefore, in order to perform a desired capacity control just after start-up, the liquid refrigerant in the control chamber (crank chamber) needs to be discharged as quickly as possible.

Thus, as shown in FIG. 12 and FIG. 13, the conventional capacity control valve 160 includes a liquid refrigerant discharge function in order to discharge the liquid refrigerant in the control chamber (crank chamber) as quickly as possible at the time of start-up. That is, if the variable capacity compressor is stopped and then is intended to be started after a long-time standing, high-pressure liquid refrigerant accumulated in the control chamber (crank chamber) flows into the third valve chamber 184 from the third communication passage 174. Then, the pressure-sensitive body (bellows) 178 contracts and the third valve part 179 and the valve seat body 180 are opened therebetween, and the liquid refrigerant is discharged to the discharge chamber via the suction chamber out of the control chamber (crank chamber) through the auxiliary communication passage 185, the intermediate communication passage 186 and the circulation groove 172 from the third valve chamber 184 and is vaporized rapidly, thereby capable of achieving a cooling operation state in a short time.

Subsequently, when discharge of the liquid refrigerant in the control chamber (crank chamber) is finished, the control chamber pressure Pc and the suction pressure Ps are decreased, and the third valve part 179 and the valve seat body 180 are closed therebetween. At the same time, the second valve part 176 becomes into a control state from a fully closed state by the solenoid section S, and the fluid at the discharge pressure Pd is supplied to the third valve chamber 184 from the second valve chamber 182, and thereby a differential pressure between the suction pressure Ps and the control chamber pressure Pc is changed, an inclination angle of the swash plate is changed, and a stroke (discharge capacity) of a piston is controlled.

However, in the above-described conventional art, even if discharge of the liquid refrigerant in the control chamber (crank chamber) is finished and a control operation begins, and the third valve part 179 and the valve seat surface of the valve seat body 180 are closed therebetween, the third valve chamber 184 leading to the control chamber and the first valve chamber 183 leading to the suction chamber are always communicated via the auxiliary communication passage 185 and the intermediate communication passage 186 in order to control the suction pressure Ps. Therefore, the refrigerant supplied to the control chamber from the discharge chamber in order to control the control chamber pressure flows to the suction chamber through the intermediate communication passage from the control chamber, and thus there was a problem that deterioration of operation efficiency of the variable capacity compressor is caused.

The present invention has been made to solve the problems the above-described conventional art has, and an object thereof is to provide a capacity control valve for controlling a flow rate or pressure of a variable capacity compressor according to a valve opening degree of a valve section, the capacity control valve capable of improving operation efficiency of the variable capacity compressor.

Means for Solving Problem

To attain the above object, a capacity control valve according to a first aspect of the present invention is a capacity control valve for controlling a flow rate or pressure of a variable capacity compressor according to a valve opening degree of a valve section, the capacity control valve including:

a valve main body having a first valve chamber communicating with a first communication passage through which a fluid at a first pressure passes, a third valve chamber communicating with a third communication passage through which a fluid at a third pressure passes, and a second valve chamber communicating with a second communication passage which is arranged between the first communication passage and the third communication passage and through which a fluid at a second pressure passes and having a valve hole communicating with the third valve chamber and a second valve seat arranged in the valve hole;

a pressure-sensitive body which is arranged in the third valve chamber and which extends and contracts in response to the pressure of the third valve chamber;

a valve body having an intermediate communication passage for communicating the first valve chamber and the third valve chamber, a first valve part arranged in the first valve chamber, a second valve part for opening and closing the valve hole by separating from and making contact with the second valve seat, and a valve body end part arranged in the third valve chamber;

a third communication hole which is arranged in the third valve chamber and which communicates with the third valve chamber and the intermediate communication passage 26:

a solenoid having an electromagnetic coil part, a first plunger, a stator core, and a rod for connecting the valve body and the first plunger; and a second plunger between the stator core and the valve body.

According to the first aspect, the second plunger arranged between the stator core and the valve body regulates the flow of the intermediate communication passage for communicating the first valve chamber and the third valve chamber, and therefore operation efficiency of the variable capacity compressor can be improved.

In the capacity control valve according to a second aspect of the present invention, the second plunger includes an auxiliary valve seat for opening and closing communication between the first valve chamber and the intermediate communication passage by separating from and making contact with the first valve part.

According to the second aspect, the flow leading to the first valve chamber via the intermediate communication passage from the third valve chamber can be adjusted by separation and contact between the first valve part and the second plunger, and therefore operation efficiency of the variable capacity compressor can be improved.

In the capacity control valve according to a third aspect of the present invention, the second plunger further includes an auxiliary communication hole for communicating the first valve chamber and the intermediate communication passage in parallel to the first valve part.

According to the third aspect, the first valve part and the auxiliary communication hole are parallel to each other, and therefore the flow passage can be narrowed to be constant by the auxiliary communication hole in a closed state of the first valve part, and the flow passage can be controlled by the opening of the first valve part by removing regulations by the auxiliary communication hole in an opened state of the first valve part.

In the capacity control valve according to a fourth aspect of the present invention, the auxiliary communication hole has an opening area smaller than that of the third communication hole, and the third communication hole has an opening area smaller than that between the first valve part and the second plunger.

According to the fourth aspect, by the auxiliary communication hole having the smallest opening area in the closed state of the first valve part, the fluid volume flowing to the first valve chamber via the intermediate communication passage from the third valve chamber can be regulated. Moreover, in the opened state of the first valve part, a bottleneck of the auxiliary communication hole is resolved and more flow rate from the third valve chamber to the first valve part can be obtained, and even if the first valve part is fully opened, the third communication hole serves as a bottleneck and the flow rate is regulated, and therefore a fluid does not flow unnecessarily.

In the capacity control valve according to a fifth aspect of the present invention, the auxiliary communication hole has an opening area smaller than a flow passage cross-sectional area of the intermediate communication passage.

According to the fifth aspect, the auxiliary communication hole serves as a bottleneck, and therefore the flow rate flowing to the first valve chamber via the intermediate communication passage from the third valve chamber can be regulated, and operation efficiency of the variable capacity compressor can be improved by reducing the flow rate from the third valve chamber to the first valve chamber.

In the capacity control valve according to a sixth aspect of the present invention, the second plunger has a fitting gap by which relative displacement with respect to the rod is enabled.

According to the sixth aspect, regardless of movement of the rod, the second plunger narrows the intermediate communication passage for communicating the first valve chamber and the third valve chamber, and reduces the flow rate from the third valve chamber to the first valve chamber, thereby operation efficiency of the variable capacity compressor can be improved.

In the capacity control valve according to a seventh aspect of the present invention, the valve body end part of the valve body further includes a third valve part for opening and closing communication between the intermediate communication passage and the third valve chamber by separating from and making contact with the pressure-sensitive body.

According to the seventh aspect, by the third valve part for opening and closing the intermediate communication passage and the third valve chamber, the liquid refrigerant can be discharged in a short time at the time of start-up.

In the capacity control valve according to an eighth aspect of the present invention, the first pressure is a suction pressure of the variable capacity compressor, the second pressure is a discharge pressure of the variable capacity compressor, and the third pressure is a pressure of a crank chamber of the variable capacity compressor.

In the capacity control valve according to a ninth aspect of the present invention, the first pressure is a pressure of a crank chamber of the variable capacity compressor, the second pressure is a discharge pressure of the variable capacity compressor, and the third pressure is a suction pressure of the variable capacity compressor.

According to the eighth aspect and the ninth aspect, the capacity control valve can correspond to various variable capacity compressors.

DESCRIPTION OF EMBODIMENTS

Figure 1:
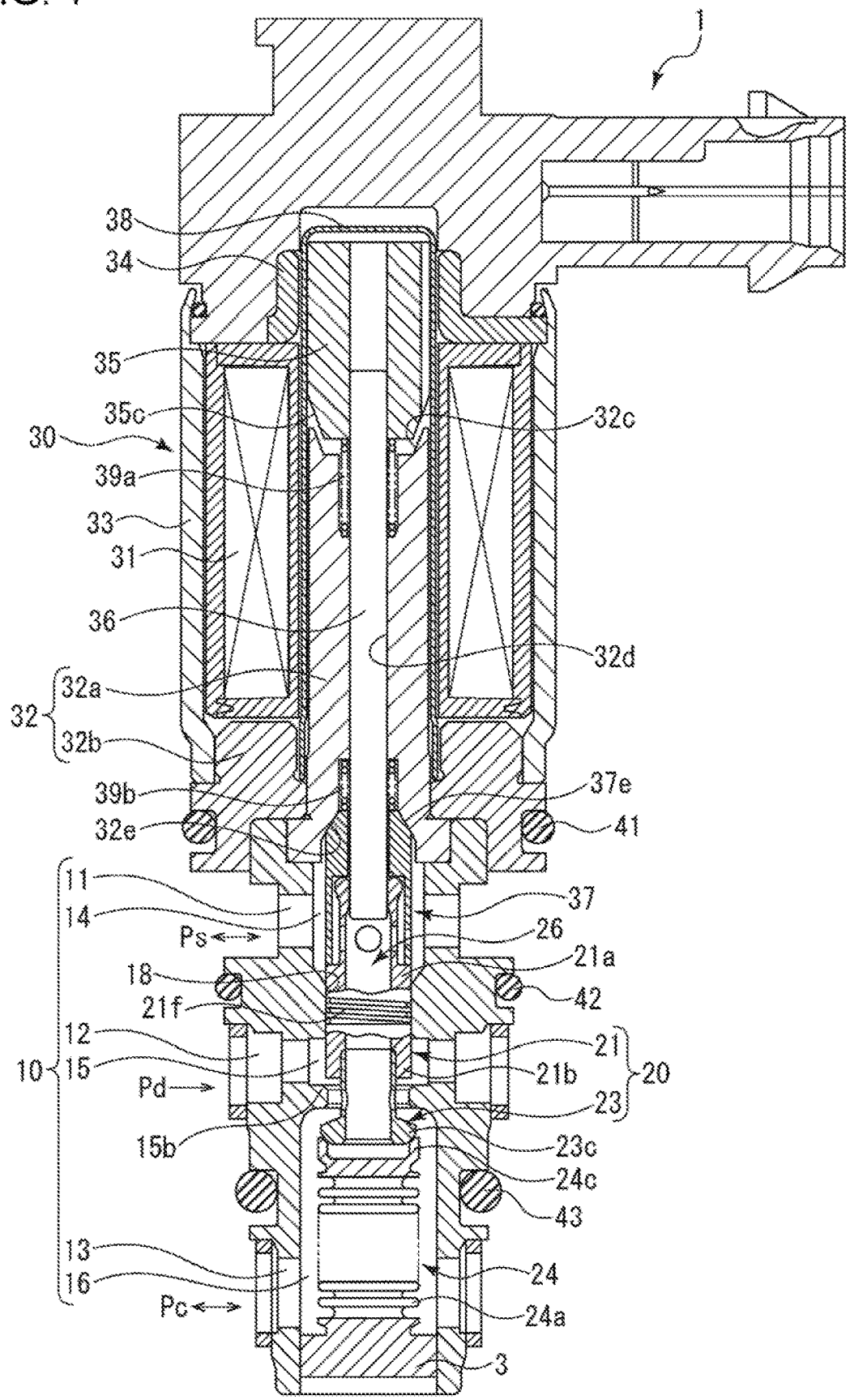
FIG. 1 is a front cross-sectional view showing a capacity control valve according to a first embodiment of the present invention.
Figure 2:
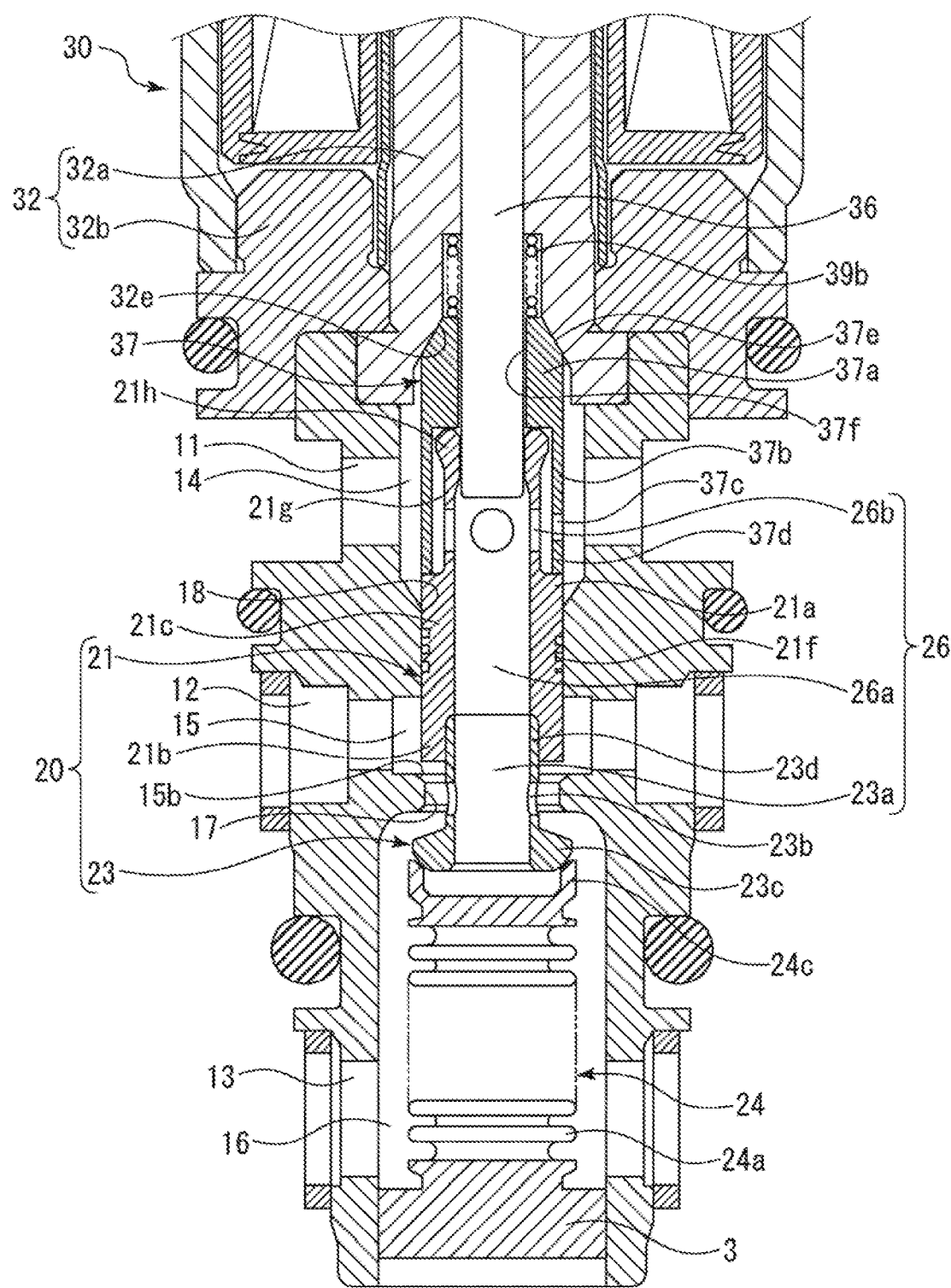
FIG. 2 is a partial enlarged view of a valve main body, a valve body and a solenoid in FIG. 1.
Figure 3:
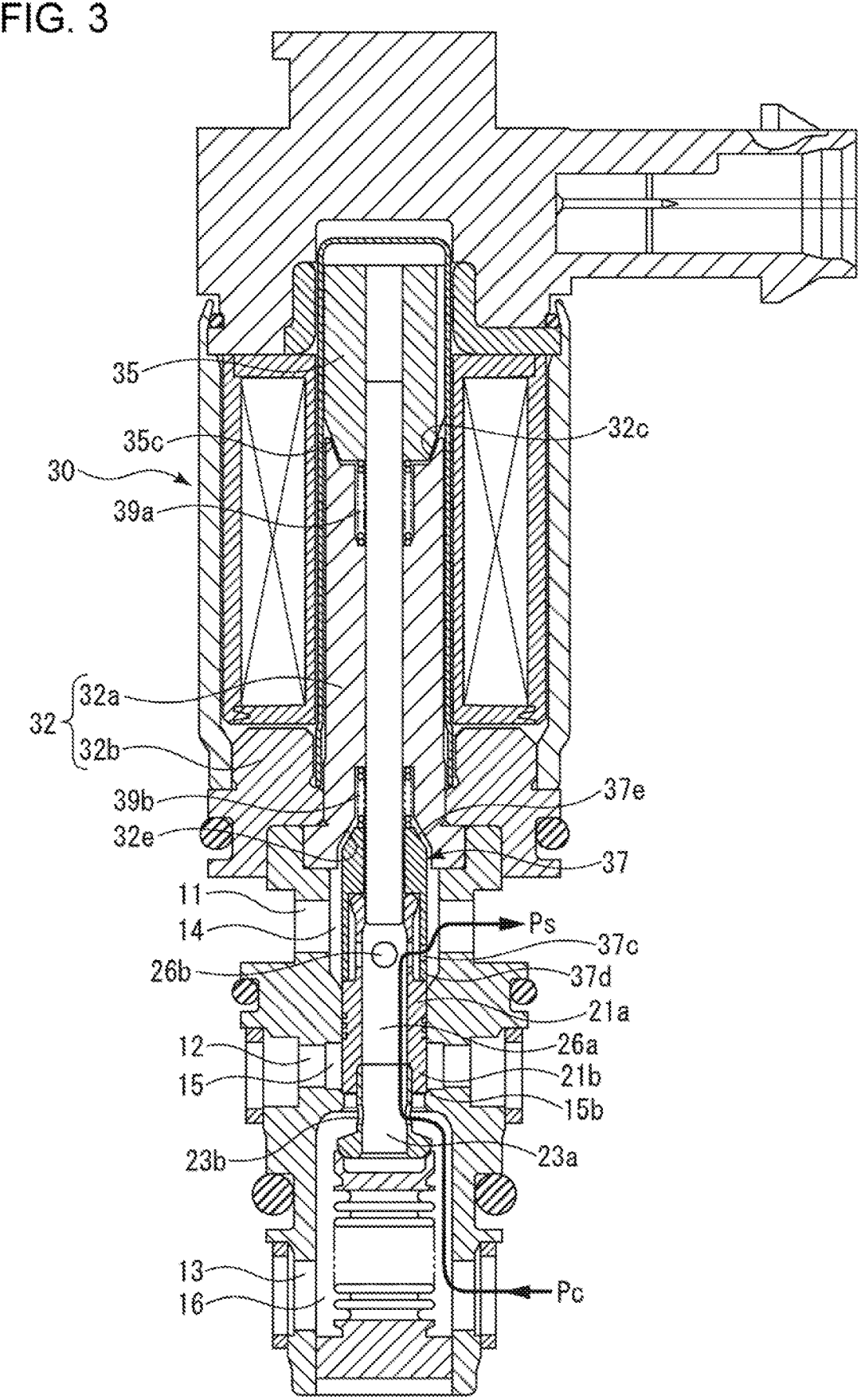
FIG. 3 is a front cross-sectional view showing the capacity control valve according to the first embodiment of the present invention, and shows a state of low current control.

Hereinafter referring to the drawings, modes for carrying out the present invention will be described illustratively based on embodiments. However, the dimensions, materials, shapes, relative arrangements, and others of components described in the embodiments are not intended to limit the scope of the present invention only to them unless otherwise described explicitly.

First Embodiment

Referring to FIG. 1 to FIG. 6, a capacity control valve according to a first embodiment of the present invention will be described. In FIG. 1, 1 denotes a capacity control valve. The capacity control valve 1 mainly consists of a valve main body 10, a valve body 20, a pressure-sensitive body 24, and a solenoid 30. Hereinafter, each configuration constituting the capacity control valve 1 will be described with reference to FIG. 1 and FIG. 2.

The valve main body 10 is composed of a metal such as brass, iron, aluminum, or stainless steel, a synthetic resin material, or the like. The valve main body 10 is a hollow cylindrical member having a through hole penetrating in an axial direction, and in a compartment of the through hole, a first valve chamber 14, a second valve chamber 15 adjacent to the first valve chamber 14, and a third valve chamber 16 adjacent to the second valve chamber 15 are sequentially arranged.

To the second valve chamber 15, a second communication passage 12 is consecutively provided. The second communication passage 12 is configured to communicate with a discharge chamber (not shown) of a variable capacity compressor such that a fluid at a discharge pressure Pd can flow into the third valve chamber 16 from the second valve chamber 15 by opening and closing of the capacity control valve 1.

To the third valve chamber 16, a third communication passage 13 is consecutively provided. The third communication passage 13 is communicated with a control chamber (not shown) of the variable capacity compressor, and allows the fluid at the discharge pressure Pd flowed into the third valve chamber 16 from the second valve chamber 15 by opening and closing of the capacity control valve 1 to flow out to the control chamber (crank chamber) of the variable capacity compressor and allows the fluid at a control chamber pressure Pc flowed into the third valve chamber 16 to flow out to a suction chamber of the variable capacity compressor through the first valve chamber 14 via an intermediate communication passage 26 described later.

Further, in the first valve chamber 14, a first communication passage 11 is consecutively provided. The first communication passage 11 allows the fluid at the control chamber pressure Pc flowed into the third valve chamber 16 from the control chamber (crank chamber) of the variable capacity compressor to flow out to the suction chamber through the first valve chamber 14 via the intermediate communication passage 26 described later.

Between the second valve chamber 15 and the third valve chamber 16, a valve hole 17 having a smaller diameter than the diameters of these chambers is consecutively provided, and around the valve hole 17 on the second valve chamber 15 side, a second valve seat 15b is formed. Moreover, between the first valve chamber 14 and the second valve chamber 15, a hole part 18 having a smaller diameter than the diameters of these chambers is consecutively provided.

In addition, the first communication passage 11, the second communication passage 12, and the third communication passage 13 penetrate through a peripheral surface of the valve main body 10 respectively, for example, at two equal intervals to six equal intervals. Further, on an outer peripheral surface of the valve main body 10, mounting grooves for O-rings are provided at three positions apart from each other in the axial direction. Then, to the respective mounting grooves, O rings 41, 42, 43 to seal between the valve main body 10 and a mounting hole (not shown) of a casing to which the valve main body 10 is fitted is mounted, and each of the first communication passage 11, the second communication passage 12, and the third communication passage 13 is configured as an independent flow passage.

In the third valve chamber 16, the pressure-sensitive body 24 is arranged. In the pressure-sensitive body 24, one end part of a metallic bellows 24a is sealingly coupled to a partition adjustment part 3. This bellows 24a is manufactured by phosphor bronze, stainless, or the like, and is designed such that its spring constant is a predetermined value. An interior space of the pressure-sensitive body 24 is a vacuum or air exists therein. Then, the pressure in the third valve chamber 16 acts to an effective pressure receiving area of the bellows 24a of the pressure-sensitive body 24, and actuates the pressure-sensitive body 24 to be extended and contracted. On a free end part side of the pressure-sensitive body 24 moving so as to extend and contract in response to the suction pressure in the third valve chamber 16, a valve seat 24c is arranged.

Then, the partition adjustment part 3 of the pressure-sensitive body 24 is sealingly fitted and fixed so as to block the third valve chamber 16 of the valve main body 10. In addition, if the partition adjustment part 3 is screwed, or fixed by a set screw (not shown), spring force of compression springs arranged in parallel within the bellows 24a or of the bellows 24a can be adjusted to be moved in the axial direction.

Next, the valve body 20 will be described. The valve body 20 consists of a valve body first member 21 and a valve body second member 23 (valve body end parts according to the present invention) which are made of hollow cylindrical members. Firstly, the valve body first member 21 will be described. The valve body first member 21 is mainly formed by a first shaft part 21g arranged in the first valve chamber 14, and a second shaft part 21c provided consecutively to the first shaft part 21g and formed to have a diameter larger than that of the first shaft part 21g. In an outer peripheral part at an intermediate position in the axial direction of the second shaft part 21c, a labyrinth 21f is formed. The second shaft part 21c is arranged on the first valve chamber 14 side and the second valve chamber 15 side across the labyrinth 21f, and the labyrinth 21f slides with the hole part 18 formed between the first valve chamber 14 side and the second valve chamber 15 side and seals the first valve chamber 14 and the second valve chamber 15. Thereby, the first valve chamber 14 and the second valve chamber 15 are configured as independent valve chambers.

At an end part of the second shaft part 21c arranged in the second valve chamber 15, a second valve part 21b is formed, and the second valve part 21b opens and closes the valve hole 17 for communicating the second valve chamber 15 and the third valve chamber 16 by separating from and making contact with the second valve seat 15b. Moreover, at an end part of the second shaft part 21c arranged in the first valve chamber 14, a first valve part 21a is formed, and the first valve part 21a opens and closes communication between the intermediate communication passage 26 and the first valve chamber 14 by separating from and making contact with the second plunger described later. An end part 21h of the first shaft part 21g is integrally coupled to a solenoid rod 36 described later, and the valve body 20 and the solenoid rod 36 are integrally driven.

Further, the valve body first member 21 includes a first intermediate communication passage 26a penetrating the valve body first member 21 in the axial direction, and a first communication hole 26b which is formed in the first shaft part 21g and which communicates the first intermediate communication passage 26a and the first valve chamber 14.

Secondly, the valve body second member 23 constituting the valve body 20 will be described. The valve body second member 23 mainly consists of a third valve part 23c arranged in the third valve chamber 16, and a tube part 23d formed to have a diameter smaller than that of the third valve part 23c, and the tube part 23d is fitted to an open end part formed at the second valve part 21b of the valve body first member 21. Moreover, the valve body second member 23 includes a second intermediate communication passage 23a penetrating a center part of the valve body second member 23 in the axial direction, and a third communication hole 23b penetrating the tube part 23d of the valve body second member 23 in a radial direction, and by the third communication hole 23b, the third valve chamber 16 is communicated with the second intermediate communication passage 23a. Moreover, the third valve part 23c makes contact with and separates from the valve seat 24c of the pressure-sensitive body 24 in parallel to the third communication hole 23b, thereby opening and closing communication between the third valve chamber 16 and the second intermediate communication passage 23a. Hereinafter, a flow passage consisting of the second intermediate communication passage 23a, the first intermediate communication passage 26a, and the first communication hole 26b is described as the intermediate communication passage 26. Here, that is, there are parallel two routes leading to the intermediate communication passage 26 from the third valve chamber 16. That is, there are a first route leading to the intermediate communication passage 26 through the third communication hole 23b from the third valve chamber 16, and a second route leading to the intermediate communication passage 26 through the third valve part 23c from the third valve chamber 16. Then, the minimum flow passage cross-sectional area of the first route is an opening area S2 of the third communication hole 23b, the minimum flow passage cross-sectional area of the second route is an opening area of the third valve part 23c, that is, an opening area S5 between the third valve part 23c and the valve seat 24c of the pressure-sensitive body 24, and the opening area S5 is set to be sufficiently larger than the opening area S2.

Next, the solenoid 30 will be described. The solenoid 30 is constituted by a solenoid rod 36 (a rod according to the present invention), a plunger case 38, a plate 34, an electromagnetic coil 31, a stator core 32 consisting of a center post 32a and a base part 32b arranged in an inner peripheral part of the electromagnetic coil 31, a first plunger 35, and a biasing means 39a arranged between the first plunger 35 and the center post 32a which are contained in a solenoid case 33. The valve body 20 and the first plunger 35 are coupled by the solenoid rod 36 movably fitted in a through hole 32d of the stator core 32, and the valve body 20 and the first plunger 35 are integrally driven.

Between the center post 32a of the stator core 32 and the first plunger 35, the biasing means 39a for biasing the first plunger 35 so as to be separated from the stator core 32 is arranged. That is, the biasing means 39a biases the second valve part 21b so as to be in an opened state from a closed state.

Moreover, between the stator core 32 of the solenoid 30 and the valve body 20, the second plunger 37 is arranged. The first plunger 35 and the second plunger 37 are arranged across the stator core 32. The second plunger 37 mainly consists of a basal part 37a having a hole part 37f fitted to the solenoid rod 36 with a gap, a tube part 37b extended in the axial direction from the basal part 37a, an auxiliary communication hole 37c formed in the tube part 37b, and an auxiliary valve seat 37d arranged at an end part of the tube part 37b. The auxiliary valve seat 37d of the second plunger 37 opens and closes communication between the intermediate communication passage 26 and the first valve chamber 14 by making contact with and separating from the first valve part 21a. Further, the second plunger 37 has the auxiliary communication hole 37c in parallel to the first valve part, and therefore, even if the first valve part 21a is in a closed state, the intermediate communication passage 26 and the first valve chamber 14 can be communicated with each other by only the auxiliary communication hole 37c of the second plunger 37. Moreover, an opening area S1 of the auxiliary communication hole 37c of the second plunger 37 is set to be smaller than the opening area of the intermediate communication passage 26. Thereby, in the closed state of the first valve part 21a, by the auxiliary communication hole 37c which has the minimum area in a flow passage leading to the first valve chamber 14 through the intermediate communication passage 26 from the third valve chamber 16, the flow passage can be narrowed to be constant, and if the parallel first valve part is in an opened state, the flow passage can be changed larger by removing regulation by the auxiliary communication hole. In addition, a hole part 37e of the basal part 37a is fitted to the solenoid rod 36 with a gap, and the second plunger 37 is movably mounted to the solenoid rod 36.

Between the stator core 32 and the second plunger 37, a biasing means 39b for biasing the second plunger 37 so as to be separated from the stator core 32 is arranged. That is, the biasing means 39b biases the auxiliary valve seat 37d so as to come into contact with the first valve part 21a and be in a closed state from an opened state.

The plunger case 38 is a bottomed hollow cylindrical member whose one end is opened. An open end of the plunger case 38 is sealingly fixed to the base part 32b of the stator core 32, and between a bottom part of the plunger case 38 and the center post 32a of the stator core 32, the first plunger 35 is movably arranged in the axial direction. Thereby, the electromagnetic coil 31 is sealed by the plunger case 38, the base part 32b of the stator core 32, and the solenoid case 33, and does not contact the refrigerant, and therefore it is possible to prevent reduction in insulation resistance.

Figure 5:
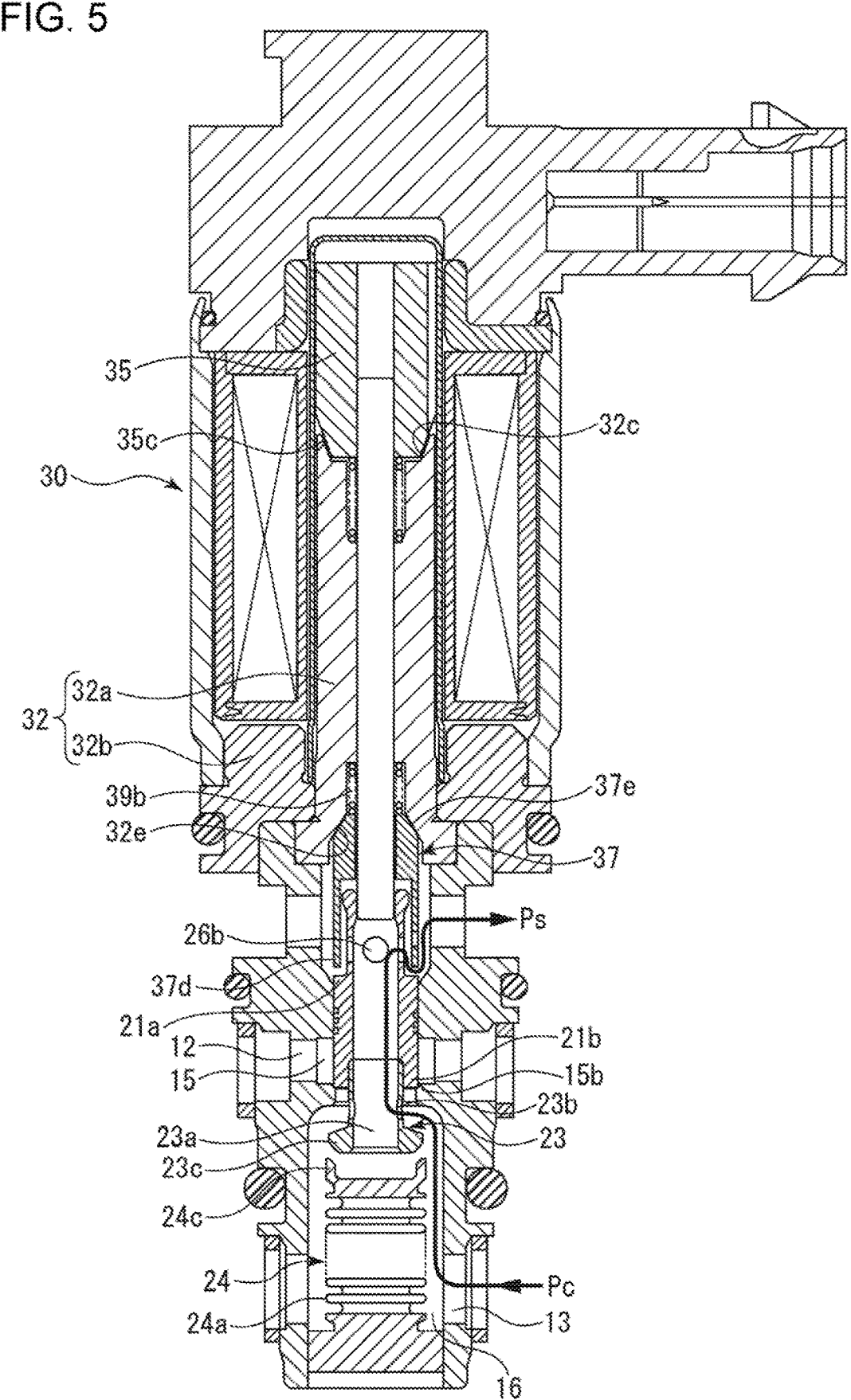
FIG. 5 is a front cross-sectional view showing the capacity control valve according to the first embodiment of the present invention, and shows a state of discharging a liquid refrigerant.
Figure 6:
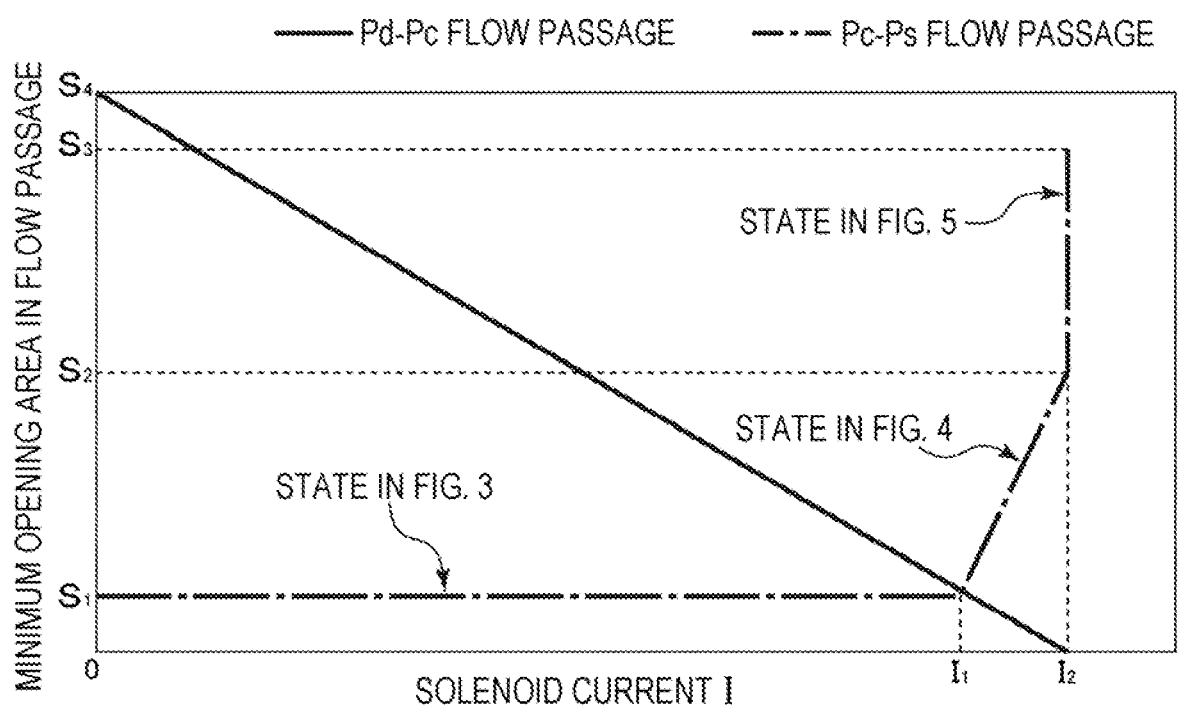
FIG. 6 is an explanatory diagram for explaining a relationship between opening areas of a Pc-Ps flow passage and a Pd-Pc flow passage and a solenoid current of the valve body of the capacity control valve according to the first embodiment.

The operation of the capacity control valve 1 having the configuration described above will be described. Description will be made with reference to FIG. 1 to FIG. 6. In addition, the flow passage leading to the first valve chamber 14 through the intermediate communication passage 26 from the third valve chamber 16 is hereinafter described as a "Pc-Ps flow passage". Moreover, a flow passage leading to the third valve chamber 16 through the valve hole 17 from the second valve chamber 15 is hereinafter described as a "Pd-Pc flow passage". FIG. 6 shows a relationship between a solenoid current and a minimum value of a flow passage cross-sectional area of each flow passage. The dot and dash line in FIG. 6 shows a relationship between the solenoid current and the minimum opening area in the Pc-Ps flow passage, and the solid line in FIG. 6 shows a relationship between the solenoid current and the minimum opening area in the Pd-Pc flow passage. Here, the opening area S1 of the auxiliary communication hole 37c of the second plunger 37, the opening area S2 of the third communication hole 23b of the valve body second member 23, and an opening area S3 between the first valve part 21a and the auxiliary valve seat 37d of the second plunger 37 are formed to be S3>S2>S1. Moreover, the flow passage cross-sectional areas of the second intermediate communication passage 23a and the first intermediate communication passage 26a which constitute the intermediate communication passage 26 and the opening area of the first communication hole 26b are formed larger than S1, S2 and S3. In addition, the opening area S3 between the first valve part 21a and the auxiliary valve seat 37d of the second plunger 37 is occasionally abbreviated to the opening area S3 of the first valve part 21a, and an opening area S4 between the second valve part 21b and the second valve seat 15b is occasionally abbreviated to the opening area S4 of the second valve part 21b, and further, an opening area S5 between the third valve part 23c and the valve seat 24c of the pressure-sensitive body 24 is occasionally abbreviated to the opening area S5 of the third valve part 23c.

As shown in FIG. 1, in a state that the electromagnetic coil 31 of the solenoid 30 is not energized, that is, in a state of a solenoid current I=0 in FIG. 6, a maximum air gap is formed between an attraction surface 32c of the stator core 32 and an operation surface 35c of the first plunger 35 by repulsion of the biasing means 39a, and the second valve part 21b is opened. Therefore, in the state of the solenoid current I=0, the opening area S4 of the second valve part 21b in the Pd-Pc flow passage becomes maximum. On the other hand, as to the second plunger 37, the auxiliary valve seat 37d contacts the first valve part 21a by repulsion of the biasing means 39b, the first valve part 21a is in a closed state, and the intermediate communication passage 26 and the first valve chamber 14 are communicated with each other by only the auxiliary communication hole 37c of the second plunger 37. Besides, the opening area S1 of the auxiliary communication hole 37c is formed smaller than the opening area of the intermediate communication passage 26, and therefore, in the state of the solenoid current I=0, the opening area S1 of the auxiliary communication hole 37c is the minimum opening area in the Pc-Ps flow passage.

Next, the state that energization to the solenoid 30 is started and the solenoid current is below a first current value I1, that is, a control state will be described with reference to FIG. 1 to FIG. 3 and FIG. 6. The control state is a state that the pressure of the suction chamber is controlled so as to be a set value Pset. When energization to the solenoid is started, the operation surface 35c of the first plunger 35 is gradually attracted to the attraction surface 32c of the stator core 32, and the opening area of the second valve part 21b is gradually narrowed in inverse proportion to the solenoid current. Therefore, as shown in FIG. 6, in the state that the solenoid current is below the first current value I1 (0<I<I1), the opening area S4 of the second valve part 21b is gradually narrowed, and therefore the area of the Pd-Pc flow passage is also gradually reduced according to an increase in current.

On the other hand, in the state that the solenoid current is below the first current value I1 (0<I<I1), the biasing force of the biasing means 39b of the second plunger 37 is set to be always larger than the force by which the second plunger 37 is attracted to the stator core 32, and therefore the auxiliary valve seat 37d of the second plunger 37 is maintained in a state of contacting the first valve part 21a by the biasing force of the biasing means 39b, the first valve part 21a is in a closed state, and the intermediate communication passage 26 and the first valve chamber 14 are communicated with each other by only the auxiliary communication hole 37c of the second plunger 37. In the state that the solenoid current I is 0<I<I1, the opening area S1 of the auxiliary communication hole 37c is the minimum opening area in the Pc-Ps flow passage.

Thereby, in the control state (0<I<I1), the space between the intermediate communication passage 26 and the first valve chamber 14 is narrowed by the auxiliary communication hole 37c of the second plunger 37 which has the minimum opening area S1, and therefore the amount of the refrigerant flowing to the first valve chamber 14 through the intermediate communication passage 26 from the third valve chamber 16 can be reduced, and thus a decrease in efficiency can be prevented by limiting the refrigerant flowing to the suction chamber from the control chamber.

Figure 4:
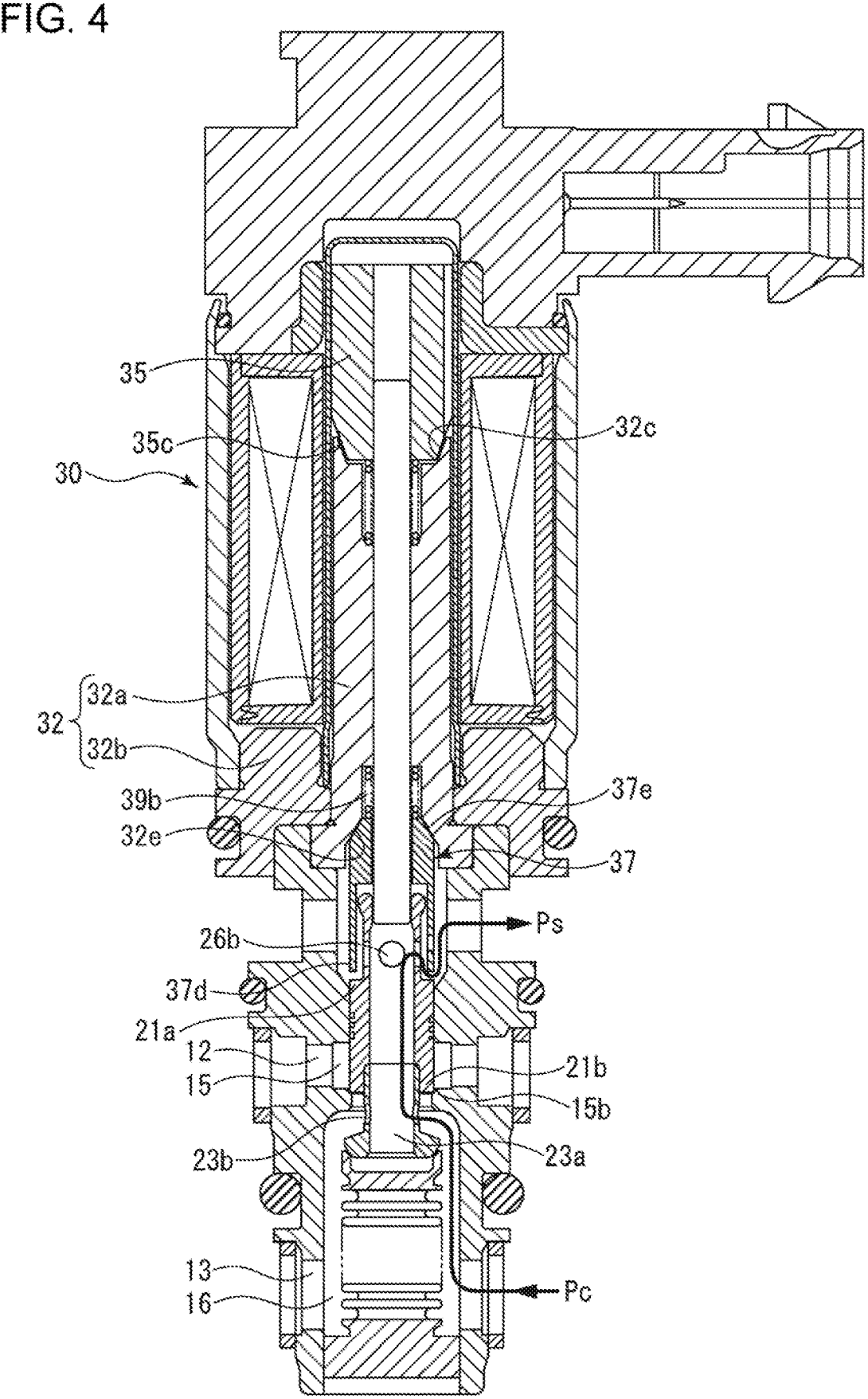
FIG. 4 is a front cross-sectional view showing the capacity control valve according to the first embodiment of the present invention, and shows a state of high current control.

Moreover, in the control state, the case where a lot of fluid at the control chamber pressure Pc is supplied to the suction chamber in order to enhance control responsiveness of the variable capacity compressor will be described with reference to FIG. 4 and FIG. 6. Control that increases solenoid energization such that the current I is in a state of being more than the first current value I1 and less than a second current value I2 (I1<I<I2) is performed. When the current I is more than the first current value I1 by solenoid energization, the first plunger 35 is maintained in a state of being attracted to the stator core 32, the opening area of the second valve part 21b is narrowed to be very small, and the opening area of the Pd-Pc flow passage is also narrowed to be small.

On the other hand, in a range of I1<I<I2 (the second current) by solenoid energization, the force by which the second plunger 37 is attracted to the stator core 32 is set larger than the biasing force of the biasing means 39b, and therefore the second plunger 37 is attracted to the stator core 32, the auxiliary valve seat 37d is disengaged from the first valve part 21a, and the first valve part 21a is opened. Here, the opening area S1 of the auxiliary communication hole 37c of the second plunger 37, the opening area S2 of the third communication hole 23b of the valve body second member 23, and the opening area S3 between the first valve part 21a and the auxiliary valve seat 37d of the second plunger 37 are formed to be S3>S2>S1. Besides, the auxiliary communication hole 37c (the opening area S1) of the second plunger 37 and the first valve part 21a (the opening area S3) are provided in parallel to each other, and therefore in the opened state of the first valve part 21a, the minimum opening area of the Pc-Ps flow passage shifts from the opening area S1 of the auxiliary communication hole 37c to the opening area S2 of the third communication hole 23b. Thereby, as shown in FIG. 6, the opening area of the Pc-Ps flow passage is increased, a lot of refrigerant can be supplied to the suction chamber from the control chamber, the pressure Ps of the suction chamber can be quickly converged to the set value Pset, and thus control responsiveness of the variable capacity compressor can be enhanced.

Further, the state that the variable capacity compressor is stopped and high-pressure liquid refrigerant accumulated in the control chamber (crank chamber) is discharged will be described with reference to FIG. 5 and FIG. 6. At such a time of discharging the liquid refrigerant, the solenoid current is set to the second current value I2, and the second plunger 37 is attracted to the stator core 32 by the maximum magnetic attractive force, thereby opening the first valve part 21a.

Further, the high-pressure liquid refrigerant flows in the third valve chamber 16, and therefore the pressure-sensitive body 24 contracts, and the third valve part 23c is separated from the valve seat 24c of the pressure-sensitive body 24 and opened. Here, the opening area S5 of the third valve part 23c is set much larger than the opening area S2 of the third communication hole 23b for communicating the third valve chamber 16 and the intermediate communication passage 26. Thereby, the minimum opening area S2 serving as a bottleneck leading to the first valve chamber from the third valve chamber is resolved, and therefore as shown in FIG. 6, the opening area of the Pc-Ps flow passage is rapidly increased, and the refrigerant is rapidly discharged to the suction chamber from the control chamber (crank chamber).

The configuration of the capacity control valve 1 according to the first embodiment of the present invention is described above and exhibits the following excellent effects.

In the capacity control valve 1 of the variable capacity compressor according to the present invention, in a normal control state that the solenoid current is 0<I<I1 (the first current), the biasing force of the biasing means 39b is set larger than the magnetic attractive force of the second plunger 37. Therefore, the auxiliary valve seat 37d contacts the first valve part 21a and the first valve part 21a is closed, and therefore the Pc-Ps flow passage area is narrowed by the auxiliary communication hole 37c of the second plunger 37 serving as a bottleneck, and the amount of the refrigerant flowing to the first valve chamber 14 from the third valve chamber 16 can be reduced. Thereby, a decrease in efficiency can be prevented by limiting the refrigerant flowing to the suction chamber from the control chamber.

In a case where a supply amount of the refrigerant from the third valve chamber 16 to the first valve chamber 14 is intended to be increased, the solenoid current is set to I1<I<I2 (the second current), and the magnetic attractive force of the second plunger 37 is increased than the biasing force of the biasing means 39b. Thereby, the auxiliary valve seat 37d of the second plunger 37 is disengaged from the first valve part 21a and the first valve part 21a is opened, and therefore as shown in FIG. 6, the opening area of the Pc-Ps flow passage is increased, and a lot of refrigerant can be supplied to the suction chamber from the control chamber.

Further, when the liquid refrigerant is discharged as with the time of start-up of the variable capacity compressor, by setting the solenoid current to the second current value I2 and maximizing the opening area of the first valve part 21a by the maximum magnetic attractive force, and at the same time, by contracting the pressure-sensitive body 24 by the high-pressure liquid refrigerant and opening the third valve part 23c, the opening area of the Pc-Ps flow passage is rapidly increased as shown in FIG. 6, and the refrigerant can be rapidly discharged to the suction chamber from the control chamber (crank chamber).

Hereinbefore, although the embodiment of the present invention has been described by the drawings, its specific configuration is not limited to the embodiment, and any changes and additions made without departing from the scope of the present invention are included in the present invention.

In the above embodiment, the flow from the intermediate communication passage 26 to the first valve chamber 14 is narrowed by providing the auxiliary communication hole 37c narrower than the area of the intermediate communication passage 26 in the second plunger 37, but the narrowing method of the flow from the intermediate communication passage 26 to the first valve chamber 14 is not limited thereto. For example, without providing the auxiliary communication hole 37c in the second plunger 37, the flow from the intermediate communication passage 26 to the first valve chamber 14 may be narrowed by controlling the current of the solenoid 30 and controlling the opening area S3 between the first valve part 21a and the auxiliary valve seat 37d of the second plunger 37. Moreover, by adjusting the fitting gap between the hole part 37f of the second plunger 37 and the solenoid rod 36, the flow from the intermediate communication passage 26 to the first valve chamber 14 may be narrowed with the use of the fitting gap.

Moreover, in the first embodiment, the first pressure of the first valve chamber 14 is the suction pressure Ps of the variable capacity compressor, the second pressure of the second valve chamber 15 is the discharge pressure Pd of the variable capacity compressor, and the third pressure of the third valve chamber 16 is the pressure Pc of the crank chamber of the variable capacity compressor, but these are not limited thereto, and the first pressure of the first valve chamber 14 may be the pressure Pc of the crank chamber of the variable capacity compressor, the second pressure of the second valve chamber 15 may be the discharge pressure Pd of the variable capacity compressor, the third pressure of the third valve chamber 16 may be the suction pressure Ps of the variable capacity compressor, and thus the capacity control valve can correspond to various variable capacity compressors.

In the above embodiment, the valve body 20 is formed by separately manufacturing the valve body first member 21 and the valve body second member 23 which are made of hollow cylindrical members and integrally assembling them, but the valve body first member 21 and the valve body second member 23 may be integrally manufactured.

In FIG. 6, the maximum opening area S4 of the second valve part is set larger than the maximum opening area S3 of the first valve part 21a, but FIG. 6 is merely an example, and the maximum opening area S3 of the first valve part 21a may be larger than the maximum opening area S4 of the second valve part. Moreover, the third communication hole 23b is provided in the valve body 20, but may be provided on the valve seat 24c side of the pressure-sensitive body 24.

Second Embodiment

Referring to FIG. 7 to FIG. 10, the capacity control valve 1 according to a second embodiment of the present invention will be described. The valve body 20 of the capacity control valve 1 according to the first embodiment has the first valve part, the second valve part and the third valve part, and the third valve part opens and closes communication between the third valve chamber 16 and the intermediate communication passage 26 by making contact with and separating from the pressure-sensitive body 24 arranged in the third valve chamber 16. A valve body 70 of a capacity control valve 50 of the second embodiment has the first valve part and the second valve part, but there is no third valve part. The second embodiment is mainly different from the first embodiment in that an end part of the valve body 70 arranged in the third valve chamber 16 is closed always in contact with the pressure-sensitive body 24, but the other basic configuration is the same as that in the first embodiment, so the same members are denoted by the same numerals and symbols, and redundant descriptions will be omitted.

The valve body 70 will be described. The valve body 70 is made of hollow cylindrical member having a first intermediate communication passage 76a penetrating in the axial direction. The valve body 70 is mainly formed by a first shaft part 71g arranged in the first valve chamber 14, a second shaft part 71c provided consecutively to the first shaft part 71g and formed to have a diameter larger than that of the first shaft part 71g, and a third shaft part 71j (a valve body end part according to the present invention) provided consecutively to the second shaft part 71c and formed to have a diameter smaller than that of the second shaft part 71c. In an outer peripheral part at an intermediate position in the axial direction of the second shaft part 71c, a labyrinth 71f is formed. The second shaft part 71c is arranged on the first valve chamber 14 side and the second valve chamber 15 side across the labyrinth 71f, and the labyrinth 71f slides with the hole part 18 formed between the first valve chamber 14 side and the second valve chamber 15 side and seals the first valve chamber 14 and the second valve chamber 15. Thereby, the first valve chamber 14 and the second valve chamber 15 are configured as independent valve chambers.

At an end part of the second shaft part 71c arranged in the second valve chamber 15, a second valve part 71b is formed, and the second valve part 71b opens and closes the valve hole 17 for communicating the second valve chamber 15 and the third valve chamber 16 by separating from and making contact with the second valve seat 15b. Moreover, at an end part of the second shaft part 71c arranged in the first valve chamber 14, a first valve part 71a is formed, and the first valve part 71a opens and closes communication between the first intermediate communication passage 76a and the first valve chamber 14 by separating from and making contact with the auxiliary valve seat 37d of the second plunger 37. Moreover, the valve body 70 includes a first communication hole 71k which is formed in the first shaft part 71g and which communicates the first valve chamber 14 and the first intermediate communication passage 76a, and a third communication hole 71m which is formed in the third shaft part 71j and which communicates the third valve chamber 16 and the first intermediate communication passage 76a. An end part 71h of the first shaft part 71g is integrally coupled to the solenoid rod 36, and the valve body 70 and the solenoid rod 36 are integrally driven. Hereinafter, a flow passage consisting of the first intermediate communication passage 76a and the first communication hole 71k is described as an intermediate communication passage 76. In addition, the opening area S1 of the auxiliary communication hole 37c of the second plunger 37, the opening area S2 of the third communication hole 71m of the third shaft part 71j, and the opening area S3 between the first valve part 71a and the auxiliary valve seat 37d of the second plunger 37 are formed to be S3>S2>S1. Moreover, the first intermediate communication passage 76a and the first communication hole 71k which constitute the intermediate communication passage 76 are formed larger than S1, S2 and S3.

In the third valve chamber 16, the pressure-sensitive body 74 is arranged. In the pressure-sensitive body 74, one end part of a metallic bellows 74a is sealingly coupled to the partition adjustment part 3. This bellows 74a is manufactured by phosphor bronze, stainless, or the like, and is designed such that its spring constant is a predetermined value. An interior space of the pressure-sensitive body 74 is a vacuum or air exists therein. Then, the control chamber pressure Pc in the third valve chamber 16 acts to an effective pressure receiving area of the bellows 74a of the pressure-sensitive body 74, and actuates the pressure-sensitive body 74 to be extended and contracted. On an end part side of the pressure-sensitive body 74 moving so as to extend and contract in response to the suction pressure in the third valve chamber 16, an end part 74c relatively movably fitted to the third shaft part 71j of the valve body 70 is formed, and a gap between the third shaft part 71*j* of the valve body 70 and the end part 74*c* of the pressure-sensitive body 74 is formed to such an extent that leakage from the gap is negligible. In addition, even if the pressure-sensitive body 74 maximally contracts by the suction pressure in the third valve chamber 16, the third shaft part 71*j* of the valve body 70 and the end part 74*c* of the pressure-sensitive body 74 are formed so as to maintain the fitting state.

Figure 10:
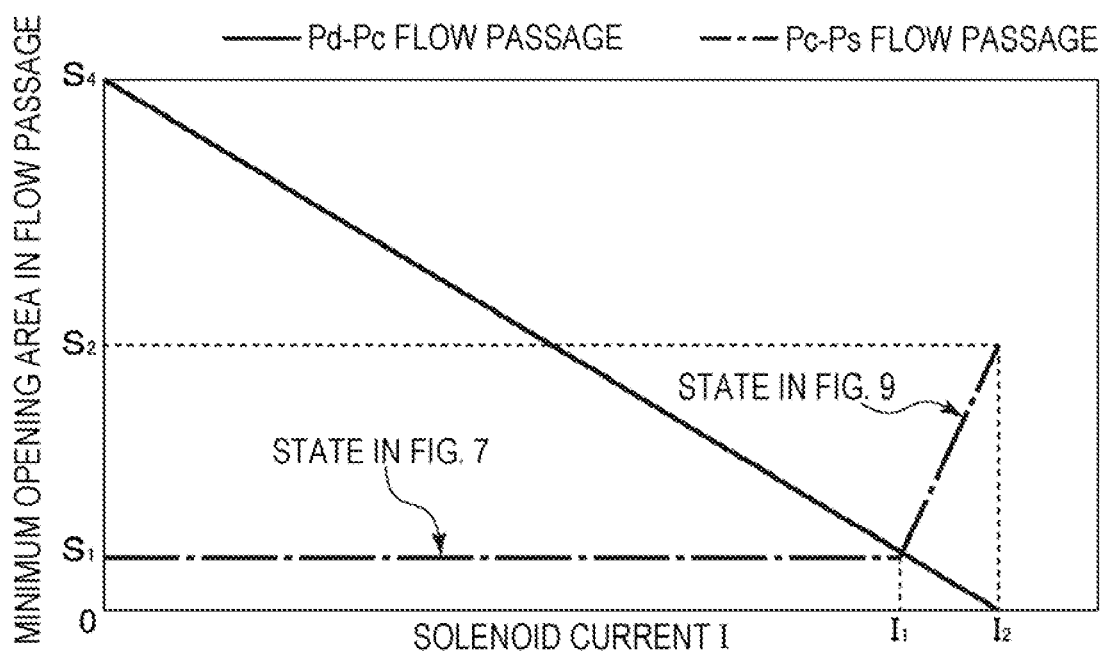
FIG. 10 is an explanatory diagram for explaining a relationship between the opening areas of the Pc-Ps flow passage and the Pd-Pc flow passage and the solenoid current of the capacity control valve according to the second embodiment.
Figure 11:
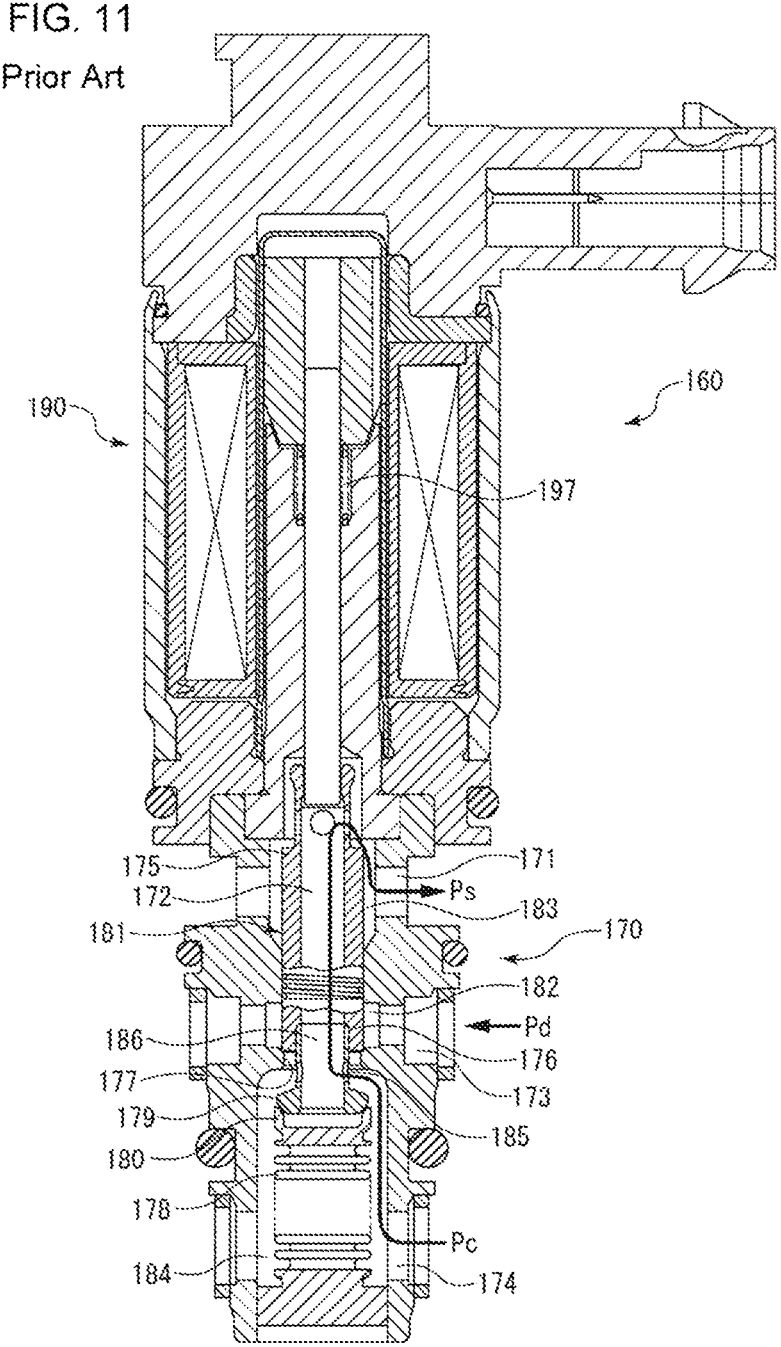
FIG. 11 is a diagram showing a state of the conventional capacity control valve at the time of low current control.
Figure 12:
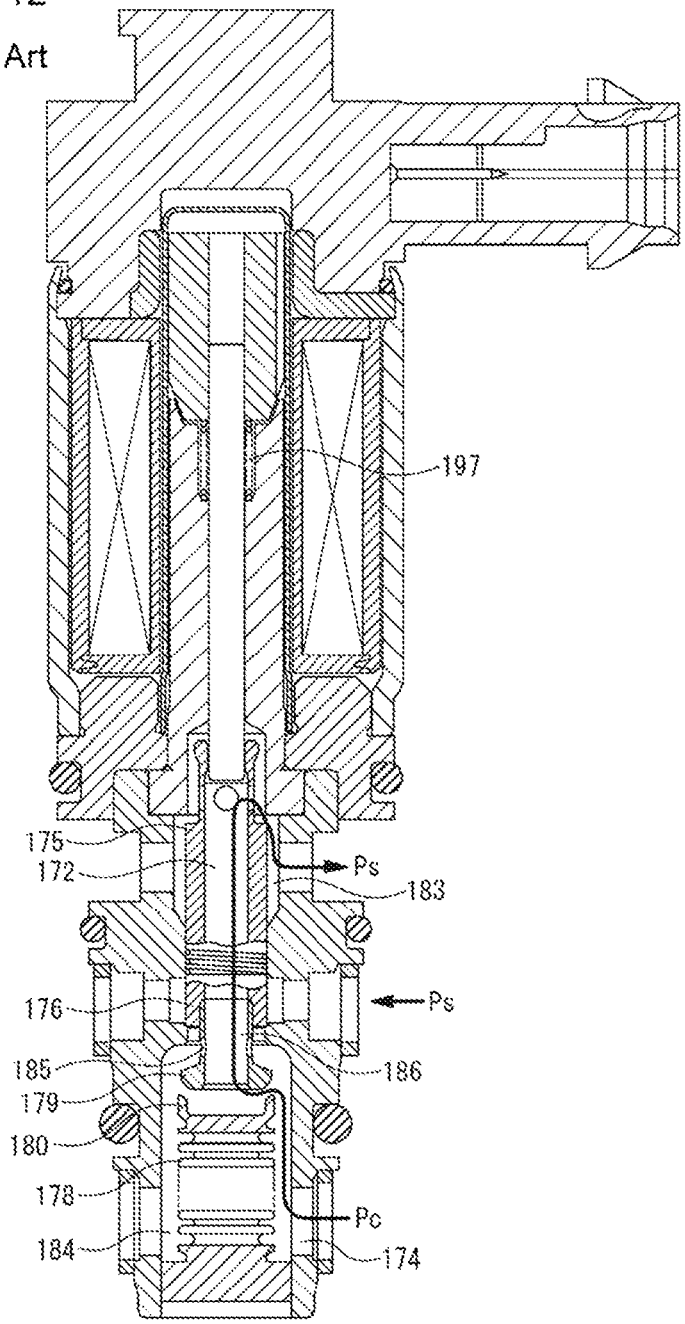
FIG. 12 is a diagram showing the conventional capacity control valve in a state of discharging the liquid refrigerant.
Figure 13:
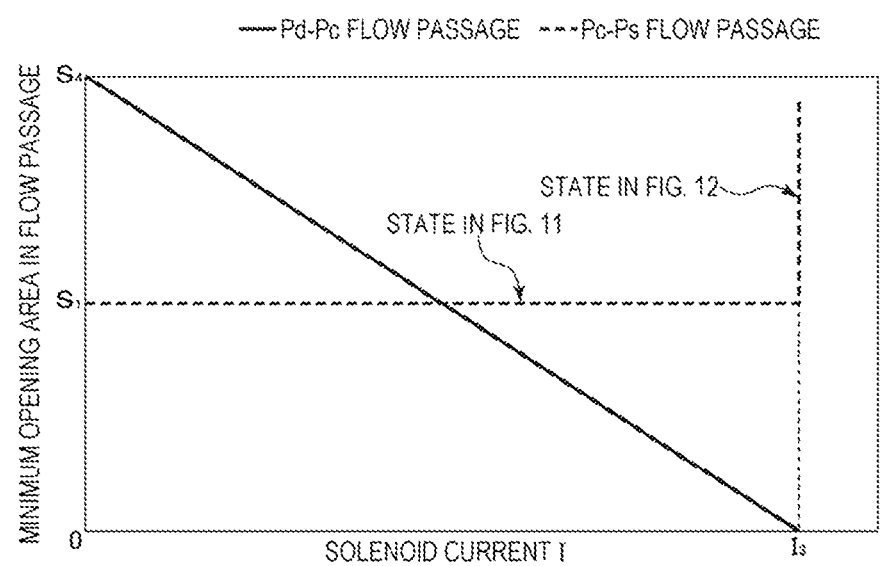
FIG. 13 is an explanatory diagram for explaining a relationship between the opening areas of the Pc-Ps flow passage and the Pd-Pc flow passage and the solenoid current of the conventional capacity control valve.

In a state that the electromagnetic coil 31 of the solenoid 30 is not energized, that is, in a state of the solenoid current I=0 in FIG. 10, a maximum air gap is formed between the attraction surface 32*c* of the stator core 32 and the operation surface 35*c* of the first plunger 35 by repulsion of the biasing means 39*a*, and the second valve part 71*b* is opened. Therefore, in the state of the solenoid current I=0, the opening area S4 of the Pd-Pc flow passage becomes maximum. On the other hand, as to the second plunger 37, the auxiliary valve seat 37*d* contacts the first valve part 71*a* by repulsion of the biasing means 39*b*, the first valve part 71*a* is in a closed state, and the intermediate communication passage 76 and the first valve chamber 14 are communicated with each other by only the auxiliary communication hole 37*c* of the second plunger 37. Besides, the opening area S1 of the auxiliary communication hole 37*c* is formed smaller than the opening area of the intermediate communication passage 76, and therefore, in the state of the solenoid current I=0, the opening area S1 of the auxiliary communication hole 37*c* is the minimum opening area in the Pc-Ps flow passage.

Figure 7:
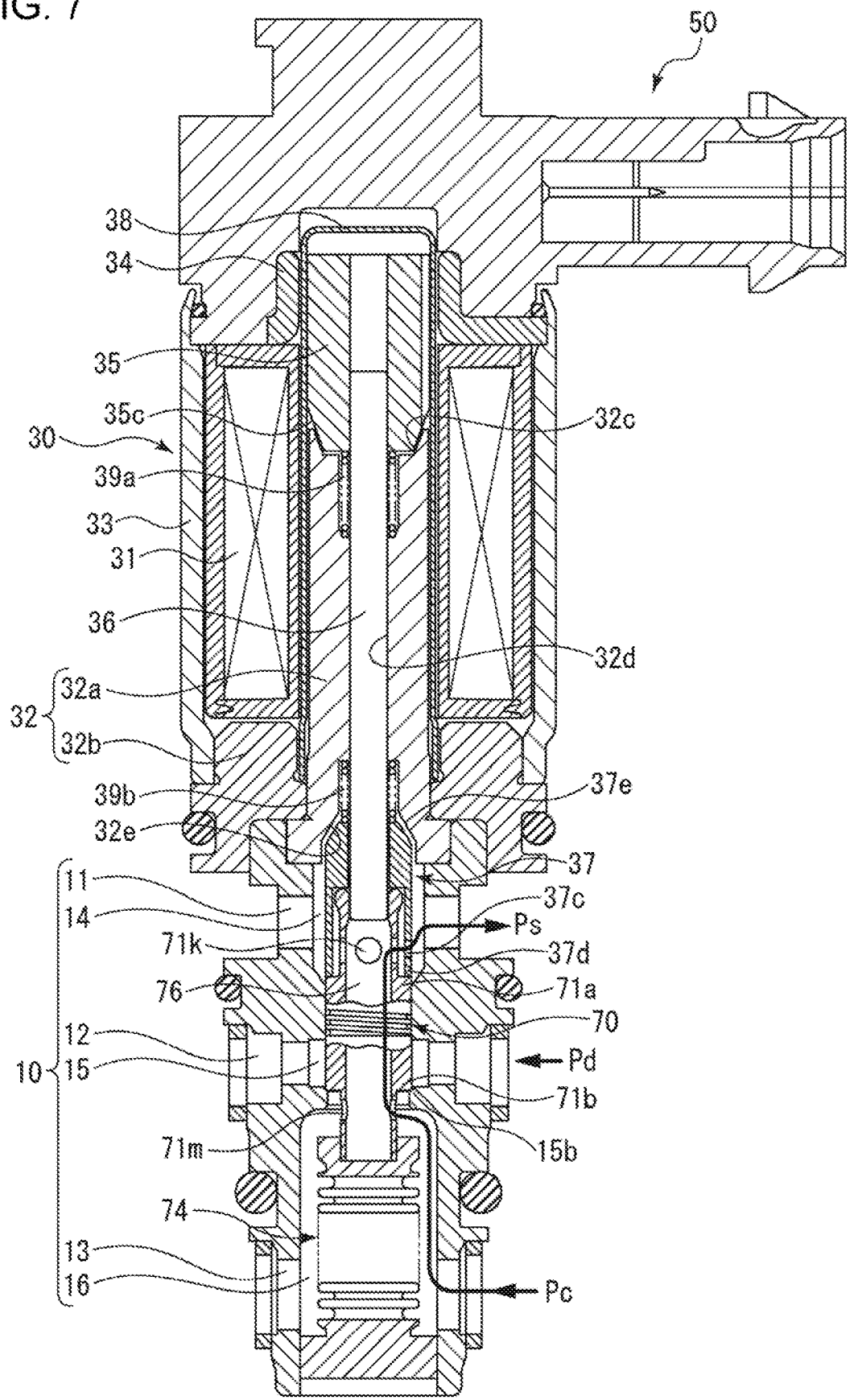
FIG. 7 is a diagram showing a state of the capacity control valve according to a second embodiment of the present invention at the time of low current control.
Figure 8:
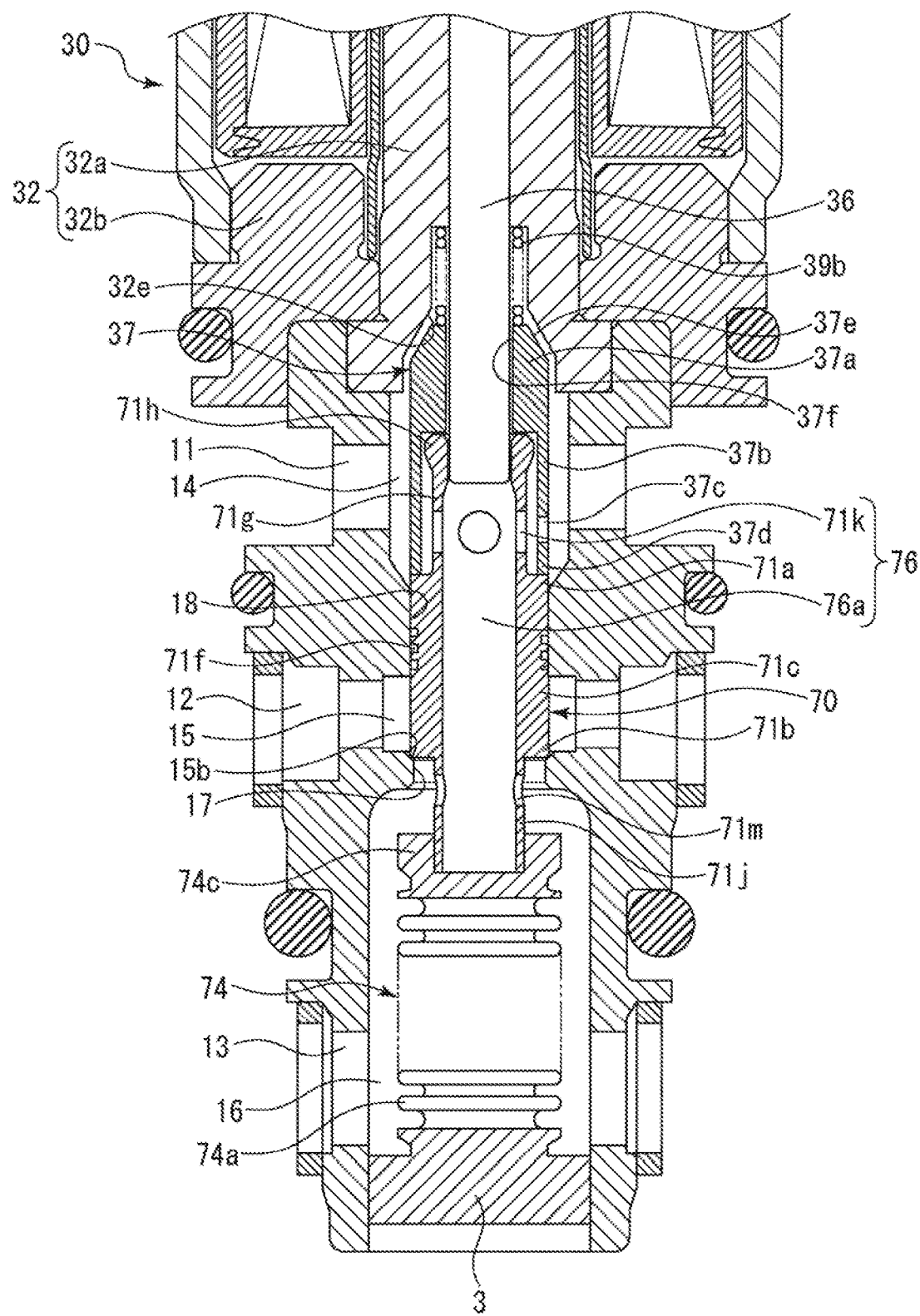
FIG. 8 is a partial enlarged view of the valve main body, the valve body and the solenoid in FIG. 7.

Next, the state that energization to the solenoid 30 is started and the solenoid current is below the first current value I1, that is, the control state will be described with reference to FIG. 7, FIG. 8 and FIG. 10. The control state is a state that the pressure of the suction chamber is controlled so as to be the set value Pset. When energization to the solenoid is started, the operation surface 35*c* of the first plunger 35 is gradually attracted to the attraction surface 32*c* of the stator core 32, and the opening area of the second valve part 71*b* is gradually narrowed in inverse proportion to the solenoid current. Therefore, as shown in FIG. 10, in the state that the solenoid current is below the first current value I1 (0<I<I1), the opening area of the second valve part 71*b* is gradually narrowed, and therefore the area of the Pd-Pc flow passage is also gradually reduced according to an increase in current.

On the other hand, in the state that the solenoid current is below the first current value I1 (0<I<I1), the biasing force of the biasing means 39*b* of the second plunger 37 is set to be always larger than the force by which the second plunger 37 is attracted to the stator core 32, and therefore the auxiliary valve seat 37*d* of the second plunger 37 contacts the first valve part 71*a* by the biasing force of the biasing means 39*b*, and the first valve part 71*a* is maintained in a closed state. The intermediate communication passage 76 and the first valve chamber 14 are communicated with each other by only the auxiliary communication hole 37*c* of the second plunger 37, and besides, the opening area S1 of the auxiliary communication hole 37*c* is formed smaller than the opening area of the intermediate communication passage 76. Therefore, in the control state (0<I<I1), the Pc-Ps flow passage area is narrowed by the auxiliary communication hole 37*c* of the second plunger 37 which serves as a bottleneck, the amount of the refrigerant flowing to the first valve chamber 14 from the third valve chamber 16 can be reduced, and thus a decrease in efficiency can be prevented by limiting the refrigerant flowing to the suction chamber from the control chamber.

Figure 9:
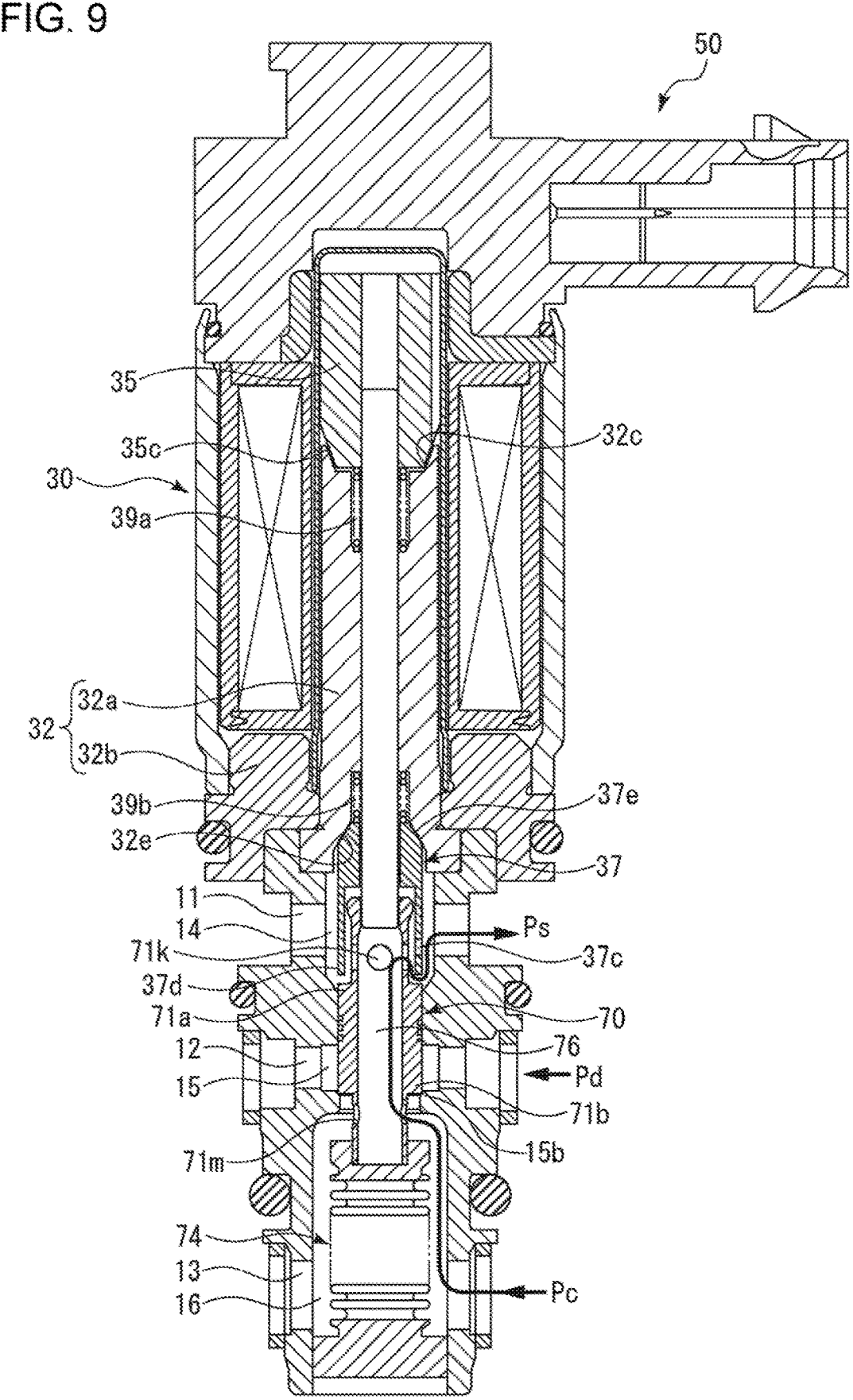
FIG. 9 is a front cross-sectional view showing a state of the capacity control valve according to the second embodiment of the present invention at the time of high current control.

Moreover, in the control state, the case where a lot of fluid at the control chamber pressure Pc is supplied to the suction chamber in order to enhance control responsiveness of the variable capacity compressor will be described with reference to FIG. 8 to FIG. 10. In this case, control that increases solenoid energization such that the current I is in a state of being more than the first current value I1 and less than the second current value I2 (I1<I<I2) is performed. When the current I is more than the first current value I1 by solenoid energization, the first plunger 35 is maintained in a state of being attracted to the stator core 32, the opening area of the second valve part 71*b* is narrowed to be very small, and the opening area of the Pd-Pc flow passage is also narrowed to be small as shown in FIG. 10.

On the other hand, in a range of I1<I<I2 (the second current) by solenoid energization, the force by which the second plunger 37 is attracted to the stator core 32 is set larger than the biasing force of the biasing means 39*b*, and therefore the second plunger 37 is attracted to the stator core 32, the auxiliary valve seat 37*d* is disengaged from the first valve part 71*a*, and the first valve part 71*a* is opened. The opening area S3 of the first valve part 71*a* is set larger than the opening area S1 of the auxiliary communication hole 37*c* of the second plunger 37, and therefore the opening area of the Pc-Ps flow passage is increased as shown in FIG. 10, and a lot of refrigerant can be supplied to the suction chamber from the control chamber. Thereby, control responsiveness of the variable capacity compressor can be enhanced by supplying a lot of refrigerant to the suction chamber from the control chamber.

The capacity control valve 50 according to the second embodiment of the present invention exhibits the following excellent effects in addition to the effects of the first embodiment.

The valve body 70 of the capacity control valve 50 of the second embodiment has no third valve part which opens and closes to the pressure-sensitive body 74, and therefore the structure thereof can be simplified and manufacturing thereof is facilitated, and a decrease in efficiency can be prevented by limiting the refrigerant flowing to the suction chamber from the control chamber and control responsiveness of the variable capacity compressor can be enhanced.

Hereinbefore, although the embodiments of the present invention have been described by the drawings, its specific configuration is not limited to these embodiments, and any changes and additions made without departing from the scope of the present invention are included in the present invention.

In the above embodiment, the flow from the intermediate communication passage 76 to the first valve chamber 14 is narrowed by providing the auxiliary communication hole 37*c* narrower than the area of the intermediate communication passage 76 in the second plunger 37, but the narrowing method of the flow from the intermediate communication passage 76 to the first valve chamber 14 is not limited thereto. For example, without providing the auxiliary communication hole 37*c* in the second plunger 37, the flow from the intermediate communication passage 76 to the first valve chamber 14 may be narrowed by controlling the current of the solenoid 30 and controlling the opening area S3 between the first valve part 71*a* and the auxiliary valve seat 37*d* of the second plunger 37. Moreover, without providing the auxiliary communication hole 37*c* in the second plunger 37, by adjusting the gap between the hole part 37*f* of the second plunger 37 and the solenoid rod 36, the flow from the intermediate communication passage 76 to the first valve chamber 14 may be narrowed with the use of the gap.

Moreover, in the second embodiment, the first pressure of the first valve chamber 14 is the suction pressure Ps of the variable capacity compressor, the second pressure of the second valve chamber 15 is the discharge pressure Pd of the variable capacity compressor, and the third pressure of the third valve chamber 16 is the pressure Pc of the crank chamber of the variable capacity compressor, but these are not limited thereto, and the first pressure of the first valve chamber 14 may be the pressure Pc of the crank chamber of the variable capacity compressor, the second pressure of the second valve chamber 15 may be the discharge pressure Pd of the variable capacity compressor, the third pressure of the third valve chamber 16 may be the suction pressure Ps of the variable capacity compressor, and thus the capacity control valve can correspond to various variable capacity compressors.

REFERENCE SIGNS LIST 1, 50 capacity control valve
3 partition adjustment part
10 valve main body
11 first communication passage
12 second communication passage
13 third communication passage
14 first valve chamber
15 second valve chamber
16 third valve chamber
20 valve body
21 valve body first member
21a first valve part
21b second valve part
23 valve body second member
23a second intermediate communication passage
23b third communication hole
23c third valve part
24 pressure-sensitive body
24c valve seat
26 intermediate communication passage
26a first intermediate communication passage
26b first communication hole
30 solenoid
31 electromagnetic coil
32 stator core
33 solenoid case
35 first plunger
36 solenoid rod
37 second plunger
37c auxiliary communication hole
70 valve body
71 valve body first member
71a first valve part
71b second valve part
74 pressure-sensitive body
74c end part
76 intermediate communication passage
Pd discharge chamber pressure
Ps suction chamber pressure
Pc control chamber pressure
S1 opening area of auxiliary communication hole 37c of second plunger 37
S2 opening area of third communication hole 23b of valve body second member 23
S3 opening area between first valve part 21a and auxiliary valve seat 37d of second plunger 37
S4 opening area between second valve part 21b and second valve seat 15b
S5 opening area S5 between third valve part 23c and valve seat 24c of pressure-sensitive body 24

The invention claimed is:

1. A capacity control valve for controlling a flow rate or pressure of a variable capacity compressor according to a valve opening degree of a valve section, comprising:
   a valve main body having a first valve chamber communicating with a first communication passage through which a fluid at a first pressure passes, a third valve chamber communicating with a third communication passage through which a fluid at a third pressure passes, a second valve chamber communicating with a second communication passage through which a fluid at a second pressure passes wherein the second communication passage is arranged between the first communication passage and the third communication passage, a valve hole communicating with the second valve chamber and the third valve chamber, and a second valve seat arranged in the valve hole;
   a pressure-sensitive body which is arranged in the third valve chamber and which extends and contracts in response to a suction pressure of the variable capacity compressor, wherein the pressure-sensitive body has a bellows wherein one end of the bellows is a free end part, and another end of the bellows is fixed to the valve main body;
   a valve body having an intermediate communication passage for communicating the first valve chamber and the third valve chamber, a first valve part arranged in the first valve chamber, a second valve part for opening and closing the valve hole by separating from and making contact with the second valve seat, and a valve body end part arranged in the third valve chamber;
   a third communication hole which is arranged in the third valve chamber and which communicates with the third valve chamber and the intermediate communication passage:
   a solenoid having an electromagnetic coil part, a first plunger, a stator core, and a rod for connecting the valve body and the first plunger; and
   a second plunger between the stator core and the valve body, wherein the second plunger includes an auxiliary valve seat for opening and closing communication between the first valve chamber and the intermediate communication passage by separating from and making contact with the first valve part.

2. The capacity control valve according to claim 1, wherein the second plunger further includes an auxiliary communication hole for communicating the first valve chamber and the intermediate communication passage at a location different than the first valve part.

3. The capacity control valve according to claim 2, wherein the auxiliary communication hole has an opening area smaller than that of the third communication hole, and the third communication hole has an opening area smaller than an opening area between the first valve part and the second plunger with the solenoid energized with a second current value.

4. The capacity control valve according to claim 3, wherein the auxiliary communication hole opening area is smaller than a flow passage cross-sectional area of the intermediate communication passage.

5. The capacity control valve according to claim 3, wherein the second plunger has a fitting gap by which relative displacement with respect to the rod is enabled.

6. The capacity control valve according to claim 2, wherein the second plunger has a fitting gap by which relative displacement with respect to the rod is enabled.

7. The capacity control valve according to claim 2, wherein the valve body end part of the valve body further includes a third valve part for opening and closing communication between the intermediate communication passage and the third valve chamber by separating from and making contact with the pressure-sensitive body.

8. The capacity control valve according to claim 2, wherein the auxiliary communication hole has an opening area smaller than a flow passage cross-sectional area of the intermediate communication passage.

9. The capacity control valve according to claim 1, wherein the second plunger has a fitting gap by which relative displacement with respect to the rod is enabled.

10. The capacity control valve according to claim 1, wherein the valve body end part of the valve body further includes a third valve part for opening and closing communication between the intermediate communication passage and the third valve chamber by separating from and making contact with the pressure-sensitive body.

\* \* \* \* \*